United States Patent [19]

Applebaum et al.

[11] Patent Number: 5,822,728
[45] Date of Patent: Oct. 13, 1998

[54] MULTISTAGE WORD RECOGNIZER BASED ON RELIABLY DETECTED PHONEME SIMILARITY REGIONS

[75] Inventors: Ted H. Applebaum; Philippe R. Morin, both of Santa Barbara, Calif.

[73] Assignee: Matsushita Electric Industrial Co., Ltd., Osaka, Japan

[21] Appl. No.: 526,746

[22] Filed: Sep. 8, 1995

[51] Int. Cl.⁶ .................................................. G10L 7/08
[52] U.S. Cl. ........................... 704/254; 704/255; 704/239
[58] Field of Search .................................. 395/2.63, 2.79, 395/2.55, 2.41, 2.65, 2.58, 2.6, 2.61, 2.64; 704/254, 270, 246, 232, 256, 249, 251, 255, 239

[56] References Cited

U.S. PATENT DOCUMENTS

| | | | |
|---|---|---|---|
| 3,770,892 | 11/1973 | Clapper | 395/2.6 |
| 4,481,593 | 11/1984 | Bahler | 395/2.62 |
| 4,489,434 | 12/1984 | Moshier | 395/2.48 |
| 4,489,435 | 12/1984 | Moshier | 395/2.53 |
| 4,528,688 | 7/1985 | Ichikawa et al. | 395/2.48 |
| 4,559,602 | 12/1985 | Bates, Jr. | 364/487 |
| 4,718,094 | 1/1988 | Bahl et al. | 295/2.65 |
| 4,723,290 | 2/1988 | Watanabe et al. | 395/2.63 |
| 4,742,547 | 5/1988 | Watanabe | 395/2.5 |
| 4,748,670 | 5/1988 | Bahl et al. | 395/2.65 |
| 4,780,906 | 10/1988 | Rajasekaran et al. | 395/2.6 |
| 4,803,729 | 2/1989 | Baker | 395/2.5 |
| 4,820,059 | 4/1989 | Miller et al. | 395/2.63 |
| 4,888,823 | 12/1989 | Nitta et al. | 395/2.65 |
| 4,905,287 | 2/1990 | Degawa | 395/2.63 |
| 4,907,274 | 3/1990 | Nomura et al. | 395/2.79 |
| 4,908,865 | 3/1990 | Doddington et al. | 395/2.5 |
| 4,924,518 | 5/1990 | Ukita | 395/2.48 |
| 4,937,871 | 6/1990 | Hattori | 395/2.42 |
| 4,987,596 | 1/1991 | Ukita | 395/2.48 |
| 5,027,408 | 6/1991 | Kroeker et al. | 395/2.63 |
| 5,129,001 | 7/1992 | Bahl et al. | 395/2.6 |

(List continued on next page.)

OTHER PUBLICATIONS

Ronald Cole, Krist Roginski and Mark Fanty, "English Alphabet Recognition With Telephone Speech"; Eurospeech 91, Sep. 91, pp. 479–482 of 4 vol.

Climent Nadeu and Biing–Hwang Juang, "Filtering of Spectral Parameters for Speech Recognition", pp. S31–24.1–S31–24.3, Sep. 1994.

Cole, Fanty, Gopalakrishnan and Janssen, "Speaker–Independent Name Retrieval From Spellings Using a Database of 50,000 Names", pp. 325–328, 1991, ICASSP–91, May 1991.

Phillippe Morin, Jean–Claude Junqua, "Habitable Interaction in Goal–Oriented Multimodal Dialogue Systems", pp. 1669–1672, Speech Technology Lab. May 1994.

Hoshimi, Miyata, Kiroaka and Niyada, "Speaker Independent Speech Recognition Method Using Training Speech From a Small Number of Speakers", pp. I–469–I–472, ICASSP–92 Mar. 92.

Yifan Gong and Jean–Paul Haton, "Plausibility Functions in Continuous Speech Recognition: The VINICS System", pp. 187–195, 1993; Speech Communication Oct., 1993.

*Primary Examiner*—Richemond Dorvil
*Attorney, Agent, or Firm*—Harness, Dickey & Pierce, P.L.C.

[57] ABSTRACT

The multistage word recognizer uses a word reference representation based on reliably detected peaks of phoneme similarity values. The word reference representation captures the basic features of the words by targets that describe the location and shape of stable peaks of phoneme similarity values. The first stage of the word hypothesizer represents each reference word with statistical information on the number of high similarity regions over a predefined number of time intervals. The second stage represents each word by a prototype that consists of a series of phoneme targets and global statistics, namely the average word duration and average match rate. These represent the degree of fit of the word prototype to its training data. Word recognition scores generated in the two stages are converted to dimensionless normalized values and combined by averaging for use in selecting the most probable word candidates.

34 Claims, 8 Drawing Sheets

U.S. PATENT DOCUMENTS

| | | | |
|---|---|---|---|
| 5,131,043 | 7/1992 | Fujii et al. | 395/2.63 |
| 5,133,012 | 7/1992 | Nitta | 395/2.65 |
| 5,195,167 | 3/1993 | Bahl et al. | 395/2.09 |
| 5,195,168 | 3/1993 | Yong | 395/2.29 |
| 5,197,113 | 3/1993 | Mumolo | 395/2.09 |
| 5,218,668 | 6/1993 | Higgins et al. | 395/2.09 |
| 5,233,681 | 8/1993 | Bahl et al. | 395/2.65 |
| 5,241,619 | 8/1993 | Schwartz et al. | 395/2.09 |
| 5,268,990 | 12/1993 | Cohen et al. | 395/2.09 |
| 5,309,547 | 5/1994 | Niyada et al. | 395/2.47 |
| 5,345,536 | 9/1994 | Hoshimi et al. | 395/2.52 |
| 5,349,645 | 9/1994 | Zhao | 395/2.52 |
| 5,369,727 | 11/1994 | Nomura et al. | 395/2.61 |
| 5,369,728 | 11/1994 | Kosaka et al. | 395/2.63 |
| 5,390,278 | 2/1995 | Gupta et al. | 395/2.52 |
| 5,528,728 | 6/1996 | Matsuura et al. | 395/2.41 |

MULTISTAGE WORD RECOGNIZER BASED ON RELIABLY DETECTED PHONEME SIMILARITY REGIONS

BACKGROUND AND SUMMARY OF THE INVENTION

The present invention relates generally to speech recognition. More particularly, the invention relates to a word recognizer having multistage word candidate hypothesizer. The system uses a compact speech representation based on regions of high phoneme similarity values. The processing stages of the word hypothesizer are applied in sequence to reduce the search space for a more computationally expensive fine match word recognition system.

Speech representation by phoneme similarities has been applied in speaker-independent, template-based word recognition systems for their relative insensitivity to speaker variations. See "Speaker Independent Speech Recognition Method Using Training Speech from a Small Number of Speakers," by M. Hoshimi et al., *Proc. ICASSP*, Vol. I, pp. 469–472, 1992; "Speaker Independent Speech Recognition Method Using Phoneme Similarity Vector," by M. Hoshimi et al., *Proc. ICSLP*, Vol. 3, pp. 1915–1918, 1994; and "A Study of English Model Speech Method," by Y. Ohno et al., *Proc. Acoustical Society of Japan*, Spring 1995 (in Japanese). Phoneme similarity values are typically computed as the normalized Mahalanobis distance between a segment consisting of consecutive linear predictive coding (LPC) analysis frames and a standard phoneme template. There is an overall consistency in the shape of the phoneme similarity time series for a given word. Similar behavior is observed in the phoneme plausibility time series of the VINICS system, as described in "Plausibility Functions in Continuous Speech Recognition: The VINICS System," by Y. Gong and J. P. Haton, *Speech Communication*, Vol. 13, Oct. 1993, pp. 187–196.

Speech recognition systems which match each input utterance to reference templates composed of phoneme similarity vectors, as in the model speech method of Hoshimi et al., cited above, have achieved high accuracies for small vocabulary tasks. Their reference speech representation is frame-based and requires a high data rate (typically 8 to 12 parameters every 10 to 20 milliseconds). The required frame-by-frame alignment is computationally costly and makes this approach unsuitable for larger vocabularies, especially on small hardware. Because the approach is computationally costly, it is not well suited to consumer product applications that, for cost reasons, cannot use large, powerful processors.

The present invention represents a significant departure from current frame-based techniques. Whereas current techniques require a fixed number of parameters at a regular frame rate interval, the present invention removes this restriction through a novel compact speech representation based on regions of high phoneme similarity values. A multistage word hypothesizer is used prior to frame-by-frame alignment in order to reduce the search space and thereby improve real time performance. The number of stages in the hypothesizer, as well as the computational complexity of each stage, and the number of word candidates preserved at each stage can be adjusted to achieve desired goals of speed, memory size and recognition accuracy for a particular application. Unlike with conventional techniques, the parameters used by the hypothesizer stages are not required to occur at regular time intervals.

The word hypothesizer and fine match stages of the invention share the initial representation of speech as a sequence of multiple phoneme similarity values. The word hypothesizer stages further refine this speech representation, to preserve only the interesting regions of high phoneme similarity, or features. By representing the speech as features at a lower data rate in the initial stages of recognition, the complexity of the matching procedure is greatly reduced. In effect, the hypothesizer stages select the most probable word candidates and thereby reducing the search space for the fine match procedure.

To further improve recognition reliability the probability scores obtained at each stage of the word hypothesizer are combined with the scores of the fine match procedure in order to produce a final word decision. Because each of the respective stages may use a different word selection strategy, the probability scores produced at each stage are quasi-independent. By combining these quasi-independent sources of information produced at each step, a significant gain in accuracy is obtained.

According to one aspect of the invention, a word recognizer for processing an input speech utterance is provided for a speech recognition system. The recognizer includes a phone model database for storing phone model speech data that corresponds to a plurality of phonemes. A phoneme similarity module, receptive of the input speech utterance, accesses the phone model database and produces phone similarity data indicative of the correlation between the input speech utterance and the phone model speech data corresponding to successive intervals of time. A high similarity module is coupled to the phone similarity module for identifying those intervals of time that contain phone similarity data that exceed a predetermined threshold. A region count hypothesizer stage, which includes a first word prototype database for storing similarity region count data for a plurality of words, is coupled to the high similarity module. The region count hypothesizer generates a first list of word candidates selected from the first word prototype database, based on similarity regions.

A target congruence hypothesizer stage, having a second word prototype database for storing word prototype data corresponding to a plurality of predetermined words, receives the first list of word candidates from the region count hypothesizer stage. The target congruence hypothesizer stage is coupled to the high similarity module for generating a second list of at least one word candidate that is selected from the first list based on similarity regions.

A word recognizer stage, having a word template database for storing word template data corresponding to a plurality of predetermined words, receives the second list of word candidates from the target congruence hypothesizer stage. The word recognizer selects the recognized word from the second list.

For a more complete understanding of the invention, its objects and advantages, reference may be had to the following specification and to the accompanying drawings.

DESCRIPTION OF THE PREFERRED EMBODIMENT

Figure 1:
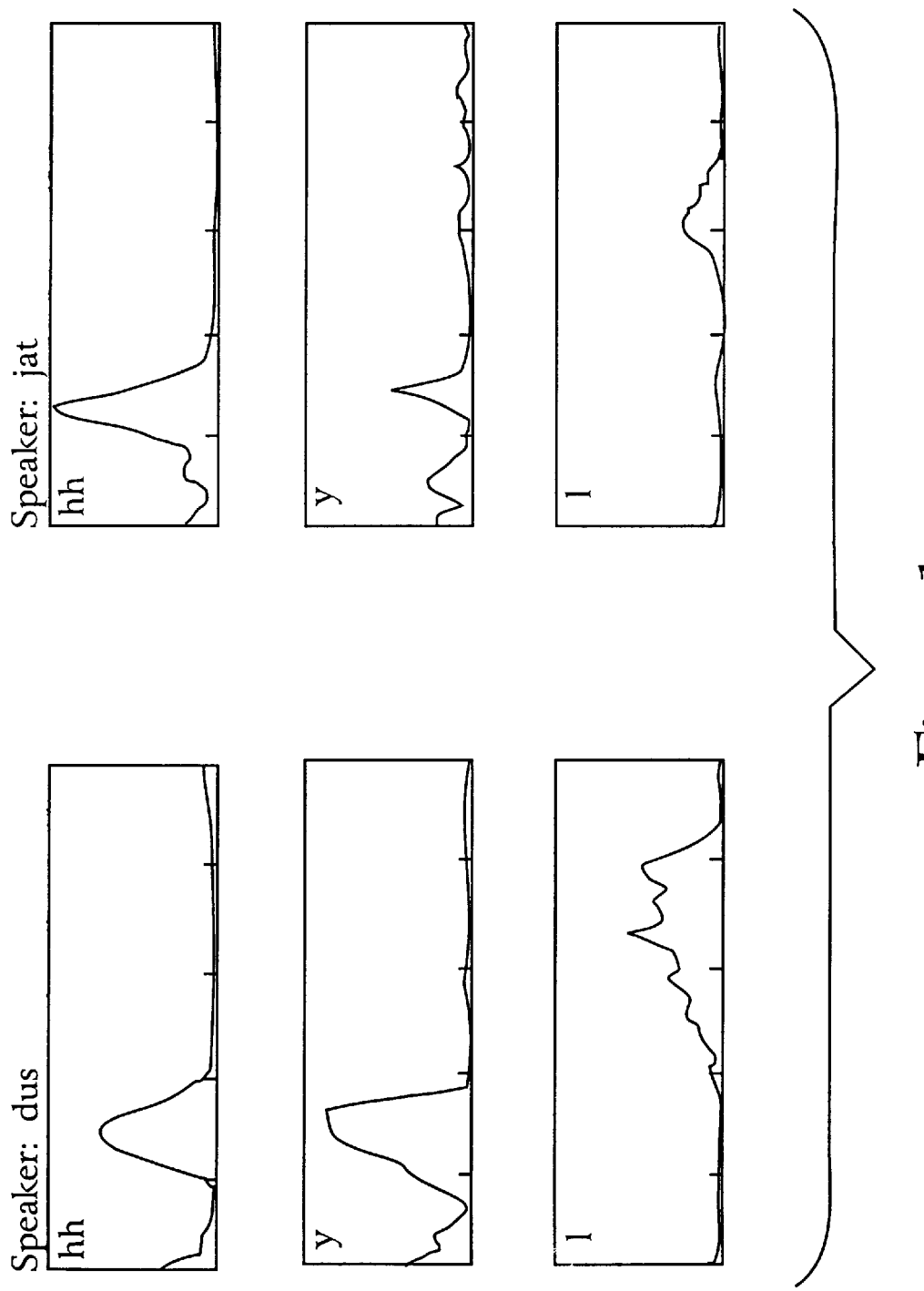
FIG. 1 is a phoneme similarity time series for the word "hill" spoken by two speakers.

The present invention employs a unique compact speech representation based on regions of high phoneme similarity values. As shown in FIG. 1, there is an overall consistency in the shape of the phoneme similarity time series for a given word. In FIG. 1 phoneme similarity time series for the word "hill" spoken by two speakers are compared. Although the precise wave shapes differ between the two speakers, the phoneme similarity data nevertheless exhibit regions of similarity between the speakers. Similar behavior is observed in the phoneme plausibility time series that has been described by Gong and Haton in "Plausibility Functions in Continuous Speech Recognition: The VINICS System," *Speech Communication,* Vol. 13, Oct. 1993, pp. 187–196.

Conventional speech recognition systems match each input utterance to reference templates, such as templates composed on phoneme similarity vectors, as in the model speech method (MSM) of Hoshimi et al. In these conventional systems the reference speech representation is frame-based and requires a high data rate, typically 8 to 12 parameters every 10 to 20 milliseconds. The frame-by-frame alignment that is required with these conventional systems is computationally costly and makes this approach unsuitable for larger vocabularies, especially when using small hardware.

Figure 2:
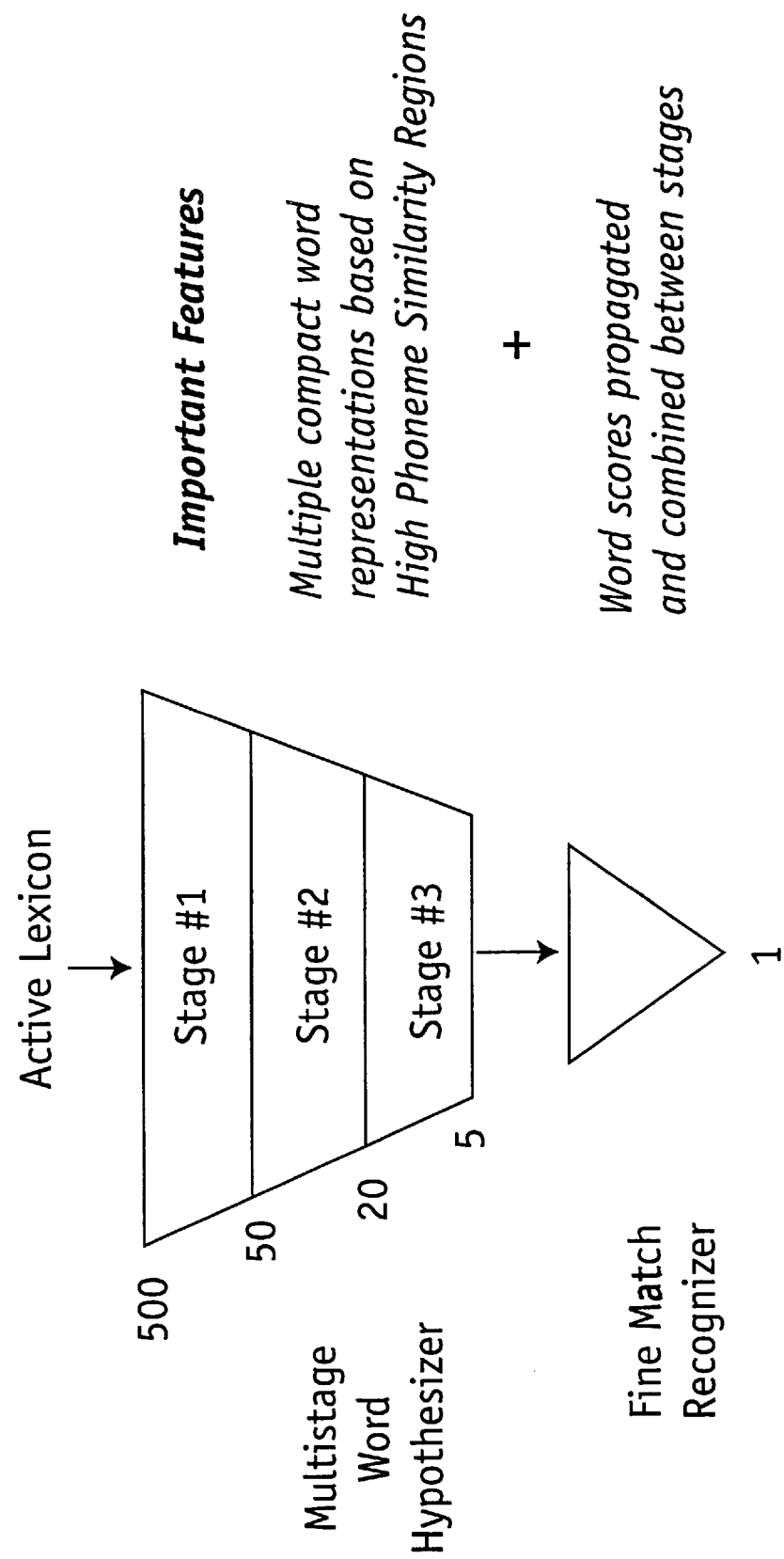
FIG. 2 is a diagram showing the integration of multiple stages of word hypothesization with a fine match procedure.
Figure 3:
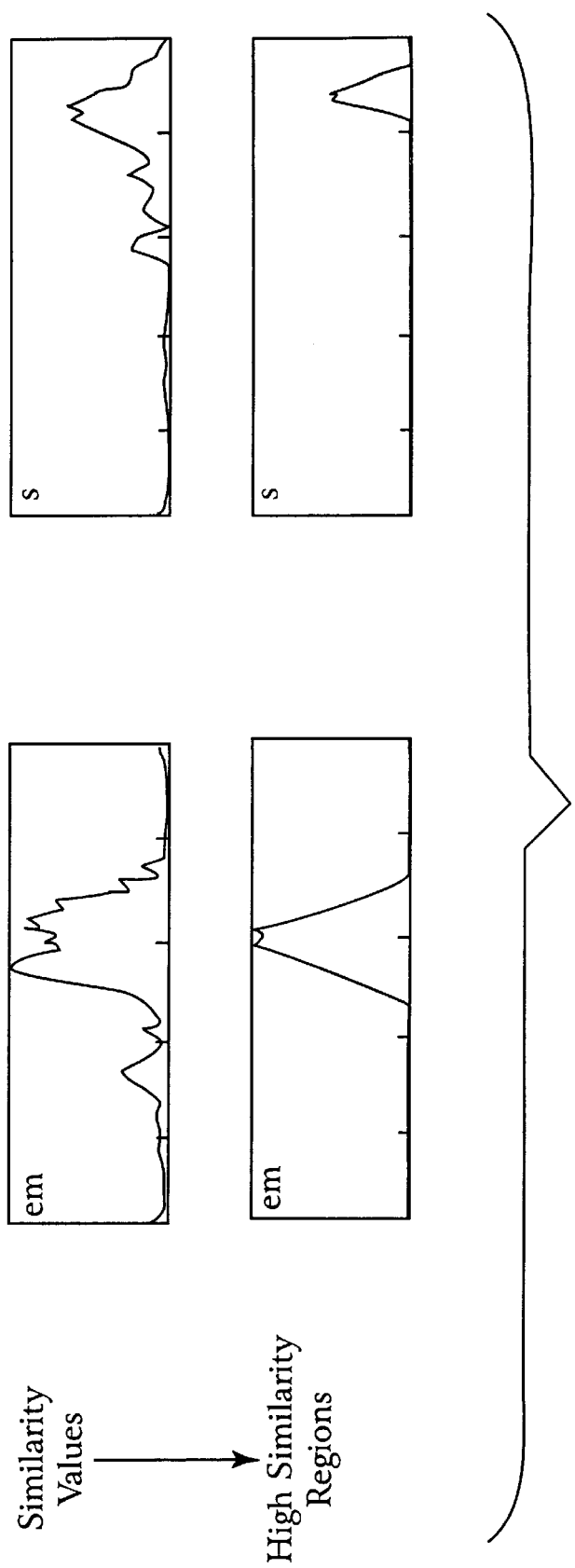
FIG. 3 is a series of graphs showing the output of the region picking procedure whereby similarity values are converted into high similarity regions.

The present system uses a multistage word hypothesizer that is applied prior to a frame-by-frame alignment, in order to reduce the search space and to achieve real time performance improvements. As demonstrated in FIG. 2, the number of stages in the hypothesizer, as well as the computational complexity of each stage and the number of word candidates preserved at each stage, can be adjusted to achieve desired goals of speed, memory size and recognition accuracy for a particular application. The word hypothesizer and fine match procedure share the initial representation of speech as a sequence of multiple phoneme similarity values. However, the word hypothesizer further refines this speech representation to preserve only the interesting regions of high phoneme similarity. Referring to FIG. 3, the interesting regions of high phoneme similarity value are represented as high similarity regions. By representing the speech as features at a lower data rate in the initial stages of recognition, the complexity of the matching procedure is greatly reduced.

The multistage word hypothesizer also employs a unique scoring procedure for propagating and combining the scores obtained at each stage of the word hypothesizer with the scores of the fine match procedure in order to produce a final word decision. By combining the quasi-independent sources of information produced at each stage, a significant gain in accuracy is obtained.

The system's architecture features three distinct components that are applied in sequence on the incoming speech to compute the best word candidate.

Figure 4:
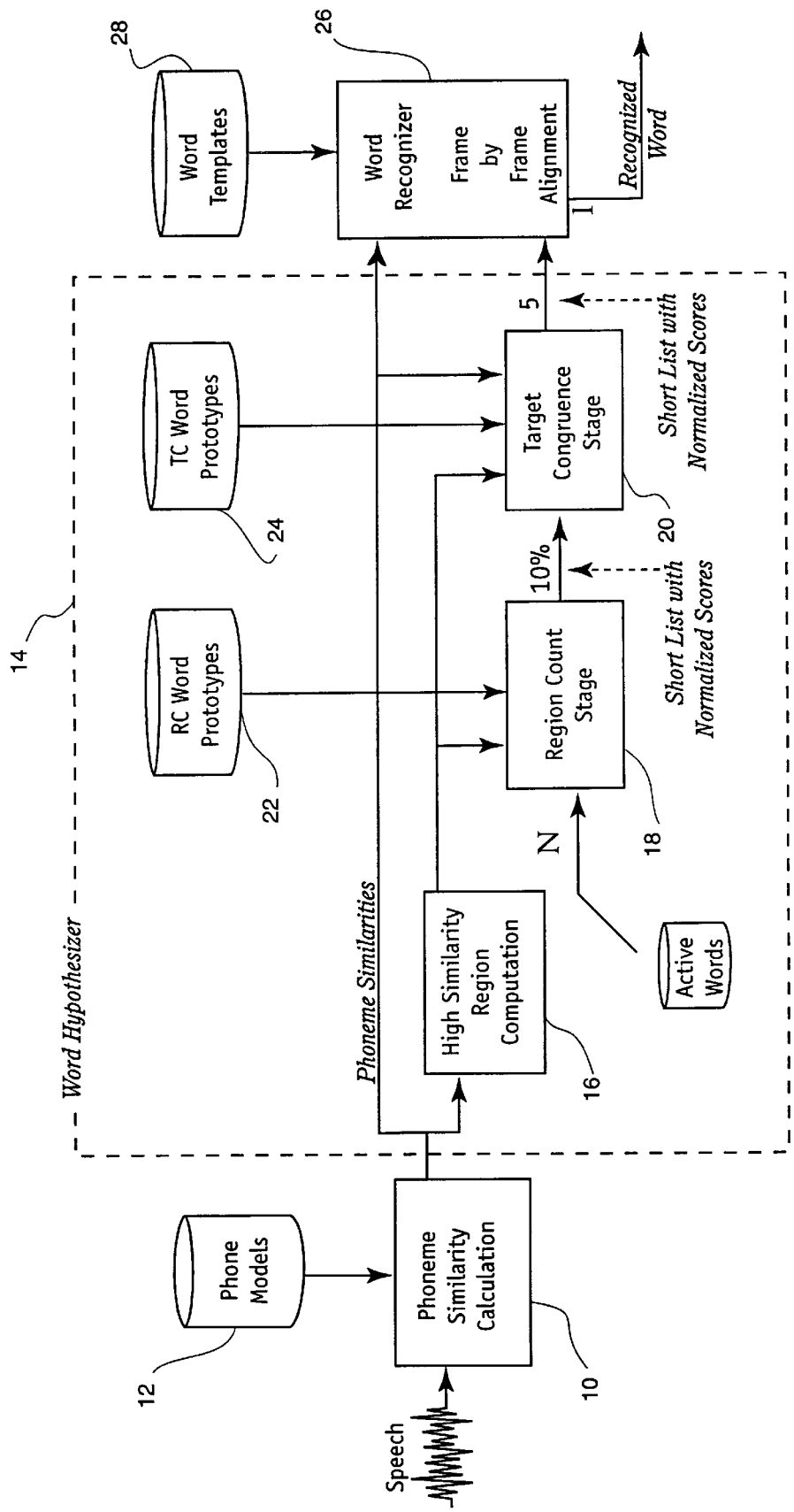
FIG. 4 is a block diagram of the presently preferred word recognizer system.

Referring to FIG. 4, an overview of the presently preferred system will be presented. The first component of the present system is a phoneme similarity front end 10 that converts speech signals into phoneme similarity time series. Speech is digitized at 8 kilohertz and processed by 8th order linear predictive coding (LPC) analysis to produce 8 cepstral coefficients every 100th of a second. Each block of 10 successive frames of cepstral coefficients is compared to 55 phoneme reference templates (a subset of the TIMIT phoneme units) to compute a vector of multiple phoneme similarity values. The block of analysis frames is then shifted by one frame at a time to produce a vector of phoneme similarity values each centisecond (each 100th of a second). As illustrated in FIG. 4, the phoneme similarity front end works in conjunction with a phone model database 12 that supplies the phoneme reference templates. The output of the phoneme similarity front end may be stored in a suitable memory for conveying the set of phoneme similarity time series so generated to the word hypothesizer stages.

The word hypothesizer stages, depicted in FIG. 4 generally at 14, comprise the second major component of the system. A peak driven procedure is first applied on the phoneme similarity time series supplied by front end 10. The peak driven procedure extracts High Similarity Regions (HS Regions). In this process, low peaks and local peaks of phoneme similarity values are discarded, as illustrated in FIG. 3. In the preferred embodiment regions are characterized by 4 parameters: phoneme symbol, height at the peak location and time locations of the left and right frames. Over our data corpus, an average of 60 regions per second of speech is observed. In FIG. 4 the high similarity region extraction module 16 performs the peak driven procedure. The output of the HS region extraction module is supplied to 2 different word hypothesizer stages that operate using different hypothesizer techniques to provide a short list of word candidates for the fine match final recognizer stage 26.

The first of the two stages of word hypothesizer 14 is the Region Count stage or RC stage 18. This stage extracts a short list of word candidates that are then supplied to the next stage of the word hypothesizer 14, the Target Congruence stage or TC stage 20. The RC stage 18 has an RC word prototype database 22 that supplies compact word representations based on the novel compact speech representation (regions of high phoneme similarity values) of the invention. Similarly, the TC stage 20 also includes a TC word prototype database 24 that supplies a different compact word representation, also based on the compact speech representation of the invention. The TC stage provides a more selective short list of word candidates, essentially a further refinement of the list produced by the RC stage 18.

The fine match word recognition stage 26, the final major component of the present system, is preferably a fine match word recognizer that performs frame-by-frame alignment to select the recognized word from the short list supplied by TC stage 20. The word recognizer stage 26 also uses a word template database 28. The presently preferred word recognizer may be implemented according to the techniques described in "A Study of English Model Speech Method," by Y. Ohno et al., *Proc. Acoustical Society of Japan,* Spring 1995 (in Japanese).

Region Count Modeling

The RC stage 18 of word hypothesizer 14 represents each reference word with statistical information on the number of HS regions over a predefined number of time intervals. The presently preferred embodiment divides words into 3 equal time intervals in which each phoneme interval is described by (1) the mean of the number of HS regions occurring in that interval and (2) a weight that is inversely proportional to the variance, which indicates how reliable the region count is. These parameters are easily estimated from training data. Each word requires exactly 330 parameters, which corresponds to 2 statistics, each over 3 intervals each comprising 55 phoneme units (2 statistics×3 intervals×55 phoneme units).

Region count modeling was found to be very effective due to its fast alignment time (0.33 milliseconds per test word on a Sparc10 workstation) and its high top 10% accuracy. Note the high top 10% accuracy for the RC stage is graphically depicted in FIG. 6.

The region count prototype is constructed as follows. A first utterance of a training word or phrase is represented as time-dependent phoneme similarity data. In the presently preferred embodiment each utterance is divided into N time intervals. Presently each utterance is divided into 3 time intervals, with each time interval being represented by data corresponding to the 55 phonemes. Thus the presently preferred implementation represents each utterance as a 3×55 vector. In representing the utterance as a 3×55 vector, each vector element in a given interval stores the number of similarity regions that are detected for each given phoneme. Thus if 3 occurrences of the phoneme "ah" occur in the first interval, the number 3 is stored in the vector element corresponding t the "ah" phoneme.

An inductive or iterative process is then performed for each of the successive utterances of the training word or phrase. Specifically, each successive utterance is represented as a vector like that of the first utterance. The two vectors are then combined to generate the vector sum and the vector sum of the squares. In addition, a scaler count value is maintained to keep track of the current number of utterances that have been combined.

The process proceeds inductively or iteratively in this fashion, each new utterance being combined with the previous ones such that the sum and sum of squares vectors ultimately represent the accumulated data from all of the utterances.

Once all training utterances have been processed in this fashion the vector mean and vector variance are calculated. The mean vector is calculated as the sum vector divided by the number of utterances used in the training set. The vector variance is the mean of the squares minus the square of the means. The mean and variance vectors are then stored as the region count prototype for the given word or phrase. The same procedure is followed to similarly produce a mean and variance vector for each of the remaining words or phrases in the lexicon.

When a test utterance is compared with the RC prototype, the test utterance is converted into the time dependent phoneme similarity vector, essentially in the same way as each of the training utterances were converted. The Euclidean distance between the test utterance and the prototype is computed by subtracting the test utterance RC data vector from the prototype mean vector and this difference is then squared. The Euclidean distance is then multiplied by a weighting factor, preferably the reciprocal of the prototype variance. The weighted Euclidean distance, so calculated, is then converted into a scaler number by adding each of the vector component elements. In a similar fashion the weighting factor (reciprocal of the variance) is converted into a scaler number by adding all of the vector elements. The final score is then computed by dividing the scaler distance by the scaler weight.

The above process may be repeated for each word in the prototype lexicon and the most probably word candidates are then selected based on the scaler score.

Target Congruence Modeling

The second stage of the word hypothesizer represents each reference word by (1) a prototype which consists of a series of phoneme targets and (2) by global statistics, namely the average word duration and the average "match rate," which represents the degree of fit of the word prototype to its training data. In the presently preferred embodiment targets are generalized HS regions described by 5 parameters:

1. phoneme symbol;
2. target weight (percentage occurrence in training data);
3. average peak height (phoneme similarity value);
4. average left frame location;
5. average right frame location.

Word prototypes are automatically created from the training data as follows. First, HS regions are extracted from the phoneme similarity time series for a number of training speakers. The training data may be generated based on speech from a plurality of different speakers or it may be based on multiple utterances of the same training words by a single speaker. Then, for each training utterance of a word, reliable HS regions are computed by aligning the given training utterance with all other utterances of the same word in the training data. This achieves region-to-region alignment.

For each training utterance the number of occurrences (or probability) of a particular region is then obtained. At that time, regions with probabilities less than a pre-established Reliability Threshold (typically 0.25) are found unreliable and are eliminated. The word prototype is constructed by merging reliably detected, high similarity regions to form targets. At the end of that process a target rate constraint (i.e. desired number of targets per second) is then applied to obtain a uniform word description level for all the words in the lexicon. The desired number of targets per second can be selected to meet system design constraints such as the ability of a given processor to handle data at a given rate. By controlling the target rate a reduction in the number of targets is achieved by keeping only the most reliable targets. Once the word prototype has been obtained in this fashion, the average match rate and average word duration are computed and stored as part of the word prototype data.

The number of parameters needed to represent a word depends on the average duration of the word and on the level of phonetic detail that is desired. For a typical 500 millisecond word at 50 targets per second, the speech representation used by the presently preferred embodiment employs 127 parameters, which correspond to 5 values per target×50 targets per second×0.5 seconds+2 global statistics (average match rate and average word duration).

Figure 5:
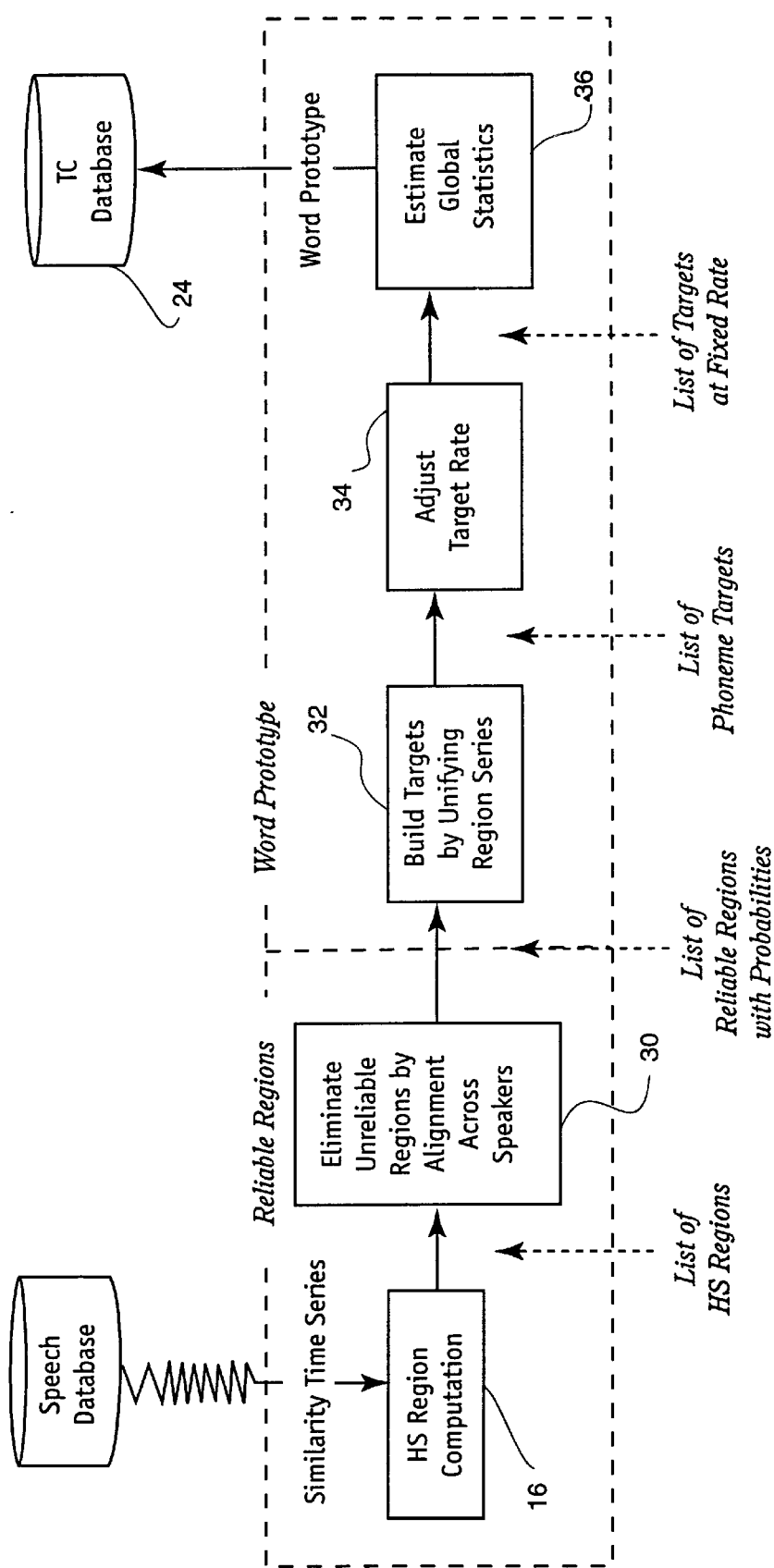
FIG. 5 is a block diagram illustrating the target congruence word prototype training procedure.

FIG. 5 illustrates the word prototype training procedure by which the TC word prototype database 24 is constructed. The RC word prototype database 22 is constructed by similar, but far simpler process, in that only the presence or absence of an HS region occurring with each of the 3 equal time intervals must be detected.

Referring to FIG. 5, the HS region computation module 16 is used to convert the similarity time series from the speech database into a list of HS regions. The alignment module 30 operates on this list of HS regions to eliminate unreliable regions by alignment across speakers. Again, the process can be performed across a plurality of different speakers or across a plurality of utterances by the same speaker.

Next the list of reliable regions, together with the associated probabilities of detecting those regions is passed to the target building module 32. This module builds targets by unifying the region series to produce a list of phoneme targets associated with each word in the database. This list of phoneme targets is then supplied to a module 34 that adjusts the target rate by applying the target rate constraint. The target rate constraint (the desired number of targets per second) may be set to a level that achieves the desired target rate. After adjusting the target rate a statistical analyzer module 36 estimates the global statistics (the average match rate and the average word duration) and these statistics along with the list of targets at the selected rate are then stored as the TC word prototype database 24.

Word Hypothesization

Given an active lexicon of N words, the region count stage is first applied to produce a short list of word candidates with normalized scores. A weighted Euclidean distance is used to measure the degree of fit of a test word X to a reference word P (in RC format as supplied by the RC word prototype database). Specifically, the weighted Euclidean distance is defined as $$D_{RC}(X,P) = \sum_{i=1}^{3} \sum_{j=1}^{55} (x_{ij} - p_{ij})^2 w_{ij} / \sum_{i=1}^{3} \sum_{j=1}^{55} w_{ij}$$

where $x_{ij}$ is the number of HS regions in time interval I for phoneme j, where $p_{ij}$ is the corresponding average number of HS regions estimated on training data, and where $w_{ij}$ is the corresponding weight. The N/10 highest scoring word prototypes are preserved as word candidates and their scores (weighted Euclidean distances) are normalized by dividing each individual score by the highest score. This defines a normalized score $S_{RC}$ for each word. Normalized scores range from 0 to 1 and are dimensionless, making it possible to combine scores resulting from different scoring methods.

The target congruence stage is then applied on each word candidate selected by the RC stage. A region-to-target alignment procedure is used to produce a congruence score between the test word and a given word reference (in TC format as supplied by the TC word prototype database). The congruence score of a matched target $CG_{match}$, that is, the alignment found between target t of the prototype and region r of the test word, is defined as $$CG_{match}(t,r) = min(A_t|A_r, A_r|A_t)$$

where $A_t$ and $A_r$ respectively represent the target's area and the aligned region's area in the time similarity plane.

The congruence score of an unmatched target $CG_{match}$ is computed in the same way, using an estimate for the area $A_r$ of the missing HS region. The estimated area $A_r$ is computed as the area under the similarity curve for the target's phoneme label, between the projected locations of the target's left and right frames.

The word congruence score is computed as the weighted sum of congruence scores for all the targets, divided by the sum of their weights. Normalized congruence scores $S_{TC}$ are computed by dividing the individual congruence scores by the highest congruence score. The final score output by the word hypothesizer is a combination of the information obtained at each hypothesizer stage. In the presently preferred embodiment the final score output of the hypothesizer is:

$$S_{Hypo} = (S_{RC} + S_{TC})/2$$

In the presently preferred embodiment the five words having the highest combined scores are selected as word candidates for the final stage fine match process.

Word Recognition

Fine match word recognition is performed in stage 26. Unlike the word hypothesizer 14, the word recognizer stage 26 uses the phoneme similarity time series directly in a frame-by-frame, dynamic programming match on the list of 5 word candidates given by the hypothesizer. Fine match recognition scores are normalized (SFM) and are combined with the scores of the hypothesizer. The global score of each word in the short list is then defined as:

$$S_{Global} = (S_{Hypo} + S_{FM})/2$$

Evaluation Task

Recognition word accuracy was evaluated in isolated word speaker-independent mode on a speech database of 100 English proper names. Testing was performed in several noise conditions: clean test speech and speech with additive noise at 20 dB or 10 dB signal-to-noise ratio. Two kinds of nonstationary additive noise were used in testing: car noise, which was recorded in a moving Toyota Crown automobile; and data show noise, which was recorded in a large exhibition hall and contains multitalker babble and music.

Phoneme models were trained on the TIMIT database SX sentences, downsampled to 8 kHz sampling rate. For training nominal clean phoneme models, each sentence was used twice: once as clean speech and once with artificially added stationary pink Gaussian noise at 20 dB SNR. (This combination was found to improve recognition results, even for clean test conditions). For training multistyle phoneme models, the additive noise was replaced by data show noise at 10 dB SNR.

Word level training and testing was done on one repetition of speech data from 64 talkers. Word prototypes were trained and tested on nonoverlapping gender-balanced sets of 32 talkers each. Under the clean training condition, word prototypes were built using the nominal clean phoneme models and 1 training pass over the noise-free training speech data. Word prototypes, for the multistyle training condition, used multistyle phoneme models and two training passes over the speech data: once clean and once with 10 dB SNR additive data show noise. Each recognition data point resulted from 3200 trials.

Figure 6:
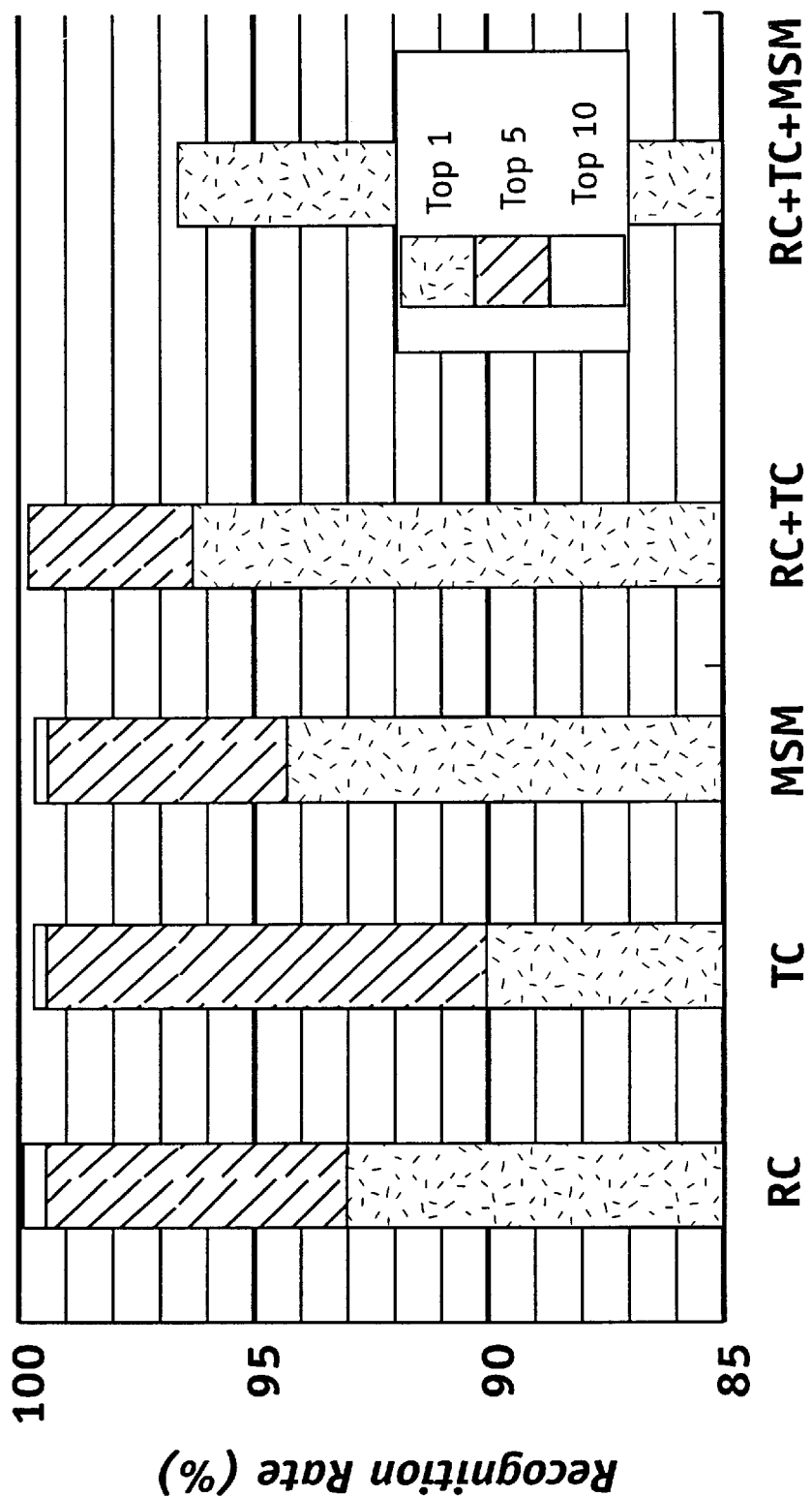
FIG. 6 is a bar graph comparing recognition results for clean test speech for the two hypothesizer stages (RC, TC) and the fine match stage (MSM), the word hypothesizer (RC+TC) and the recognition system as a whole (RC+TC+MSM). Recognition rates are given as percentages and the word prototypes for this depiction were trained on clean speech only.

Recognition rates are shown in FIG. 6 for the different stages and combinations in the system. The output of the hypothesizer (list of top 5 word candidates) shows no critical deterioration (99.6% accuracy) even when compared to original fine match alone (99.3% accuracy for top 5 candidates). Due to the independence of the errors made by the RC and TC stages, the word hypothesizer, which combines the scores from its two stages, achieves better top 1 recognition than any stage alone. The best top 1 recognition rate (96.5%) is achieved by the whole recognition system, where the fine match is run on the top 5 word candidates from the hypothesizer, and the final word decision is made by combining the normalized scores from the hypothesizer and the fine match.

Figure 7:
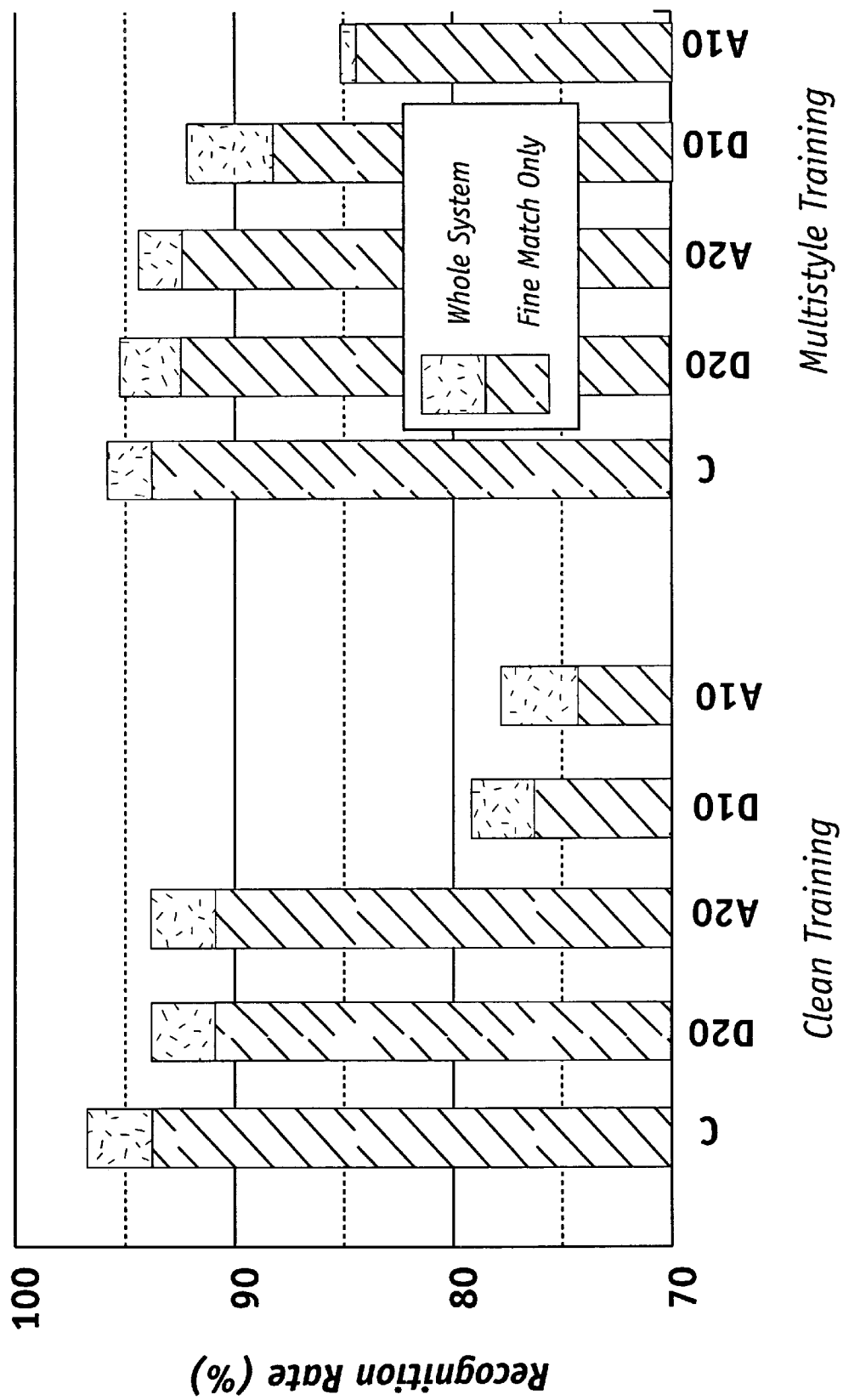
FIG. 7 is a bar graph that compares the recognition rates under five test speech conditions: clean, data show 20 dB, car 20 dB, data show 10 dB, and car 10 dB SNR. Word prototypes were trained on clean speech (left) or on both clean and noisy (data show noise at 10 dB SNR) speech (right)

Top 1 recognition rates under two training speech conditions and 5 test speech conditions are shown in FIG. 7. The effect of multistyle training on error rate was not found to be significant (p=0.05, by McNemar test) in clean test conditions, and was found to significantly reduce the error rate by 22% to 66% in noisy test conditions. For more information on the McNemar test see "Some Statistical Issues in the Comparison of Speech Recognition Algorithms," by L. Gillick and S. J. Cox, *Proc. ICASSP*, 1989, pp. 532–535. Use of the word hypothesizer improved recognition performance (compared to exhaustive search by the fine match alone) for every test condition under multistyle training. The error reduction due to the hypothesizer was insignificant (2%) for 10 dB car noise, but was 25% or more for each of the 4 other test conditions.

Figure 8:
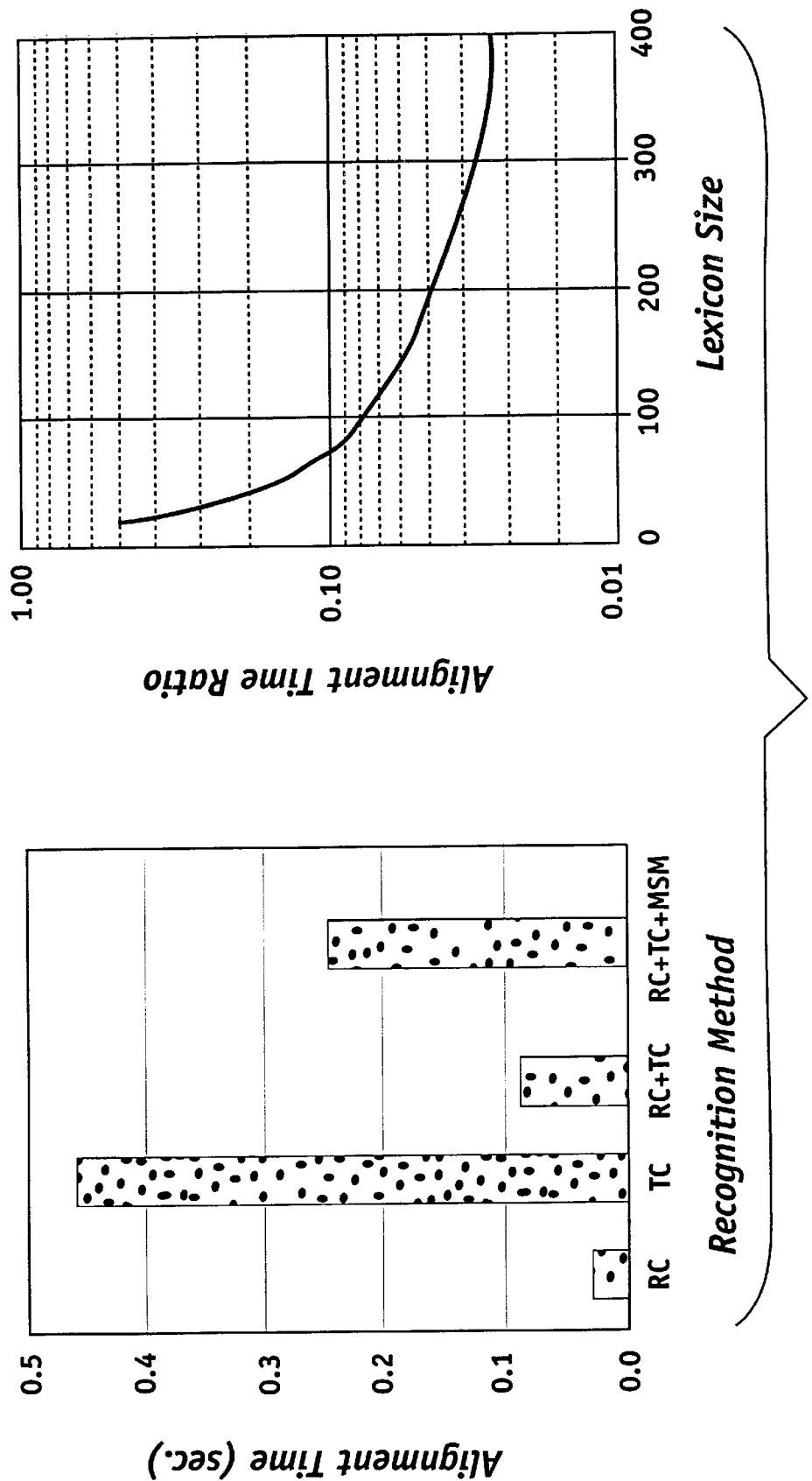
FIG. 8 is a series of graphs illustrating alignment time by stage (left) and alignment time ratio versus lexicon size (right). Alignment time is given for one test word aligned to 100 reference words. Corresponding alignment time for the fine match is 3.4 seconds. Alignment time ratio is the ratio of alignment time required by the whole system to the alignment time required for exhaustive search by the fine match alone.

The measure time for the alignment portion of the matching (independent of fixed overhead for analysis and phoneme similarity computation) is shown in the left side of FIG. 8. The times reported here were for nonoptimized software. For a 100 word lexicon the whole system requires only 7.3% of the alignment time used by the fine match alone. For larger lexicons the alignment time reduction is yet larger, as shown in the right side of FIG. 8.

A summary of the recognition performance and resource requirements of the hypothesizer alone, and in combination with the MSM fine match procedure, is shown in Table I. On the 100 word name recognition task, use of the word hypothesizer decreased alignment time to 7.3% of the time required by the fine match, while increasing the memory size of the reference data by 76%. Error rate was decreased significantly: by 30% or more (p<0.001) for clean or data show noise-corrupted test speech at up to 10 dB signal-to-noise ratio.

TABLE I

|  | Alignment Time Ratio | Memory Size | System Error Rate | | |
| --- | --- | --- | --- | --- | --- |
|  |  |  | Clean | 20 dB | 10 dB |
| Fine Match | 100% | 600 | 5.8 | 7.2 | 11.2 |
| Hypothesizer | 2.3% | 457 | 5.1 | 5.7 | 12.2 |
| Whole System | 7.3% | 1057 | 4.0 | 4.4 | 7.9 |

As suggested by Table I, the word hypothesizer may be useful by itself, as a low complexity speech recognizer. Alignment time, memory size and error rate under clean or mild noise conditions are in fact superior to the fine match procedures. The robustness of the word hypothesizer's top 1 recognition performance under various other adverse conditions is under current investigation.

The multistage word hypothesizer, combined with the MSM fine match procedure, achieves low complexity, speaker-independent, medium-size vocabulary word recognition, suitable for implementation in inexpensive, small hardware. The word hypothesizer produced large reductions of computational complexity. On a 100 word task, alignment complexity was reduced by 93%, with significant error rate reduction for clean and noisy test conditions.

What is claimed is:

1. A word recognition processor for processing an input speech utterance in a speech recognition system, comprising:

a phoneme similarity module receptive of said input speech utterance for producing phone similarity data indicative of the correlation between said input speech utterance and predetermined phone model speech data;

a high similarity module coupled to said phoneme similarity module for identifying those regions of the phone similarity data that exceed a predetermined threshold;

a region count stage having a first word prototype database for storing similarity region count data for a plurality of predetermined words;

said region count stage coupled to said high similarity module and generating a first list of word candidates selected from said first word prototype database based on similarity regions;

a target congruence stage having a second word prototype database for storing word prototype data corresponding to a said plurality of predetermined words;

said target congruence stage being receptive of said first list of word candidates and being coupled to said high similarity module for generating a second list of at least one word candidate, selected from said first list based on similarity regions.

2. The word recognition processor of claim 1 further comprising a fine match stage having word template database for storing word template data corresponding to said plurality of predetermined words;

said fine match stage being receptive of said second list of word candidates for selecting the recognized word.

3. The word recognition processor of claim 1 wherein said phoneme similarity module includes a phone model database for storing phone model speech data corresponding to a plurality of phonemes that comprise said predetermined phone model speech data.

4. The word recognition processor of claim 1 wherein said region count stage produces a first score corresponding to the degree of fit between the input utterance and each of the first list of word candidates.

5. The word recognition processor of claim 1 wherein said target congruence stage produces a second score corresponding to the degree of fit between the input utterance and each of the second list of word candidates.

6. The word recognition processor of claim 1 wherein said region count stage produces a first score corresponding to the degree of fit between the input utterance and each of the first list of word candidates;

wherein said target congruence stage produces a second score corresponding to the degree of fit between the input utterance and each of the second list of word candidates; and wherein said recognizer combines the first and second scores and selects at least the word with the best score as a final word candidate.

7. The word recognition processor of claim 6 wherein said processor combines the first and second scores by averaging.

8. The word recognition processor of claim 1 wherein said high similarity module produces a parameterized representation of high similarity regions of the phone similarity data.

9. The word recognition processor of claim 8 wherein said parameterized representation includes a representation of the phone similarity peak location and peak height.

10. The word recognition processor of claim 8 wherein said parameterized representation includes a representation of the phone similarity peak location, peak height and the left and right frame locations.

11. The word recognition processor of claim 1 wherein said region count stage represents an instance of a given spoken word or phrase by the number of high similarity regions found corresponding to each of a plurality of phoneme identifiers.

12. The word recognition processor of claim 11 further comprising means for breaking said phone similarity data into a plurality of time intervals and wherein said instance of a given spoken word or phrase is represented by the number of high similarity regions in each of said time intervals.

13. The word recognition processor of claim 1 further comprising building a region count prototype corresponding to a plurality of training instances of a spoken word or phrase.

14. The word recognition processor of claim 13 wherein said region count prototype consists of statistics based on the number of high phoneme similarity regions found for each phoneme identifier in each of a plurality of time intervals.

15. The word recognition processor of claim 14 wherein said statistics comprise the mean and inverse variance of the number of said high phoneme similarity regions found for each phoneme identifier in each of said plurality of time intervals.

16. A method for processing an input speech utterance for word recognition, comprising:

representing the input speech utterance as a phone similarity data indicative of the correlation between the input speech utterance and predetermined phone model speech data;

selecting from said phone similarity data those regions of high similarity that exceed a predetermined threshold;

testing the high similarity regions against a first predetermined word prototype database using a region count procedure that selects first list of word candidates minimizing the region count distortion with respect to the input speech utterance;

testing the high similarity regions of words in said first list against a second predetermined word prototype database using a target congruence procedure that selects from the first list a second list of word candidates having high similarity regions substantially congruent with the input speech utterance.

17. The method of claim 16 further comprising performing a fine match upon said second list of word candidates to select a single recognized word from said second list.

18. The method of claim 16 wherein said region count procedure produces a first score corresponding to the degree of fit between the input utterance and each of the first list of word candidates.

19. The method of claim 16 wherein said target congruence procedure produces a second score corresponding to the degree of fit between the input utterance and each of the second list of word candidates.

20. The method of claim 16 wherein said region count procedure produces a first score corresponding to the degree of fit between the input utterance and each of the first list of word candidates;

wherein said target congruence procedure produces a second score corresponding to the degree of fit between the input utterance and each of the second list of word candidates; and further comprising combining the first and second normalized scores and selecting the word with the best score as a final word candidate.

21. The method of claim 20 wherein said combining step is performed by averaging said first and second normalized scores.

22. The method of claim 16 further comprising representing said high similarity regions as a parameter representing the high similarity regions of the phone similarity data.

23. The method of claim 22 wherein said parameters include a representation of the phone similarity peak location and peak height.

24. The method of claim 22 wherein said parameters include a representation of the phone similarity peak location, peak height and the left and right frame locations.

25. The method of claim 16 further comprising the step of:

representing an instance of a given spoken word or phrase by the number of high phoneme similarity regions found for each of a plurality of phoneme identifiers.

26. The method of claim 25 further comprising breaking said phone similarity data into a plurality of time intervals and representing an instance of a given spoken word or phrase by the number of high similarity regions in each of said time intervals.

27. The method of claim 25 further comprising the step of:

building a region count prototype corresponding to a spoken word or phrase that consists of statistics based on the number of high phoneme similarity regions found for each phoneme identifier in each of a plurality of time intervals in the phoneme similarity data.

28. The method of claim 27 further comprising the step of:

calculating said statistics as the mean and inverse variance of the number of said high phoneme similarity regions found for each phoneme identifier, in each of a plurality of time intervals, of the training instances of the given spoken word or phrase.

29. The method of claim 27 further comprising the step of computing the recognition score for a given instance of a spoken word or phrase with respect to a given region count prototype.

30. The method of claim 29 wherein said recognition score is the Euclidean distance between: (a) the number of high phoneme similarity regions found, for each phoneme identifier, in the phoneme similarity data and (b) the mean of the number of high phoneme similarity regions found for each phoneme identifier.

31. The method of claim 29 wherein said recognition score is the Euclidean distance between: (a) the number of high phoneme similarity regions found, for each phoneme identifier, in each of a plurality of time intervals within the phoneme similarity data and (b) the mean of the number of high phoneme similarity regions, in each of said plurality of time intervals of the training instances found in the given region count prototype.

32. The method of claim 29 wherein said recognition score is a weighted Euclidean distance.

33. The method of claim 32 wherein the weight is the inverse variance from the given region count prototype.

34. The method of claim 16 further comprising:

comparing the input speech utterance with each prototype to provide a recognition score.

* * * * *